United States Patent [19]

Adams et al.

[11] Patent Number: 4,655,620

[45] Date of Patent: Apr. 7, 1987

[54] SPELLING ERROR FINDING FEATURE INCLUDING AN ELECTRONIC SPELLING DICTIONARY

[75] Inventors: Donald T. Adams, Homer; R. William Gray, Ithaca, both of N.Y.

[73] Assignee: SCM Corporation, Cortland, N.Y.

[21] Appl. No.: 813,350

[22] Filed: Dec. 26, 1985

[51] Int. Cl.[4] .............................................. B41J 5/30
[52] U.S. Cl. ...................................... 400/63; 400/83; 400/144.2; 400/697.1; 364/900
[58] Field of Search ................... 400/62, 63, 70, 74, 400/83, 98, 144.2, 695, 696, 697, 697.1, 712; 364/900

[56] References Cited

U.S. PATENT DOCUMENTS

| | | | |
|---|---|---|---|
| 3,780,846 | 12/1973 | Kolpek et al. | 400/62 X |
| 4,314,769 | 2/1982 | James, III | 400/144.2 |
| 4,328,561 | 5/1982 | Convis et al. | 400/63 X |
| 4,383,307 | 5/1983 | Gibson, III | 400/63 X |
| 4,561,793 | 12/1985 | Blanchard, Jr. | 400/697.1 |
| 4,580,241 | 4/1986 | Kucera | 400/83 X |
| 4,585,362 | 4/1986 | Gray | 400/697.1 |

OTHER PUBLICATIONS

IBM Technical Disclosure Bulletin, "Spelling Check for Selected Pages", Levine, vol. 25, No. 4, Sep. 1982, pp. 2163-2164.

IBM Technical Disclosure Bulletin, "Method for Detecting and Correcting Selected Word Spelling Errors in a Text Processing System", Barker et al., vol. 25, No. 8 Jan. 1983, p. 4225.

IBM Technical Disclosure Bulletin, "Concurrent Edit and Spell Check in a Computer System Having Multiple Processors", vol. 29, No. 1, Jun. 1986, pp. 396-398.

*Primary Examiner*—Ernest T. Wright, Jr.
*Attorney, Agent, or Firm*—Kenneth W. Greb

[57] ABSTRACT

An electronic typewriter with an electronic spelling dictionary feature included therein automatically adds a code signal to a code memory register corresponding to a print position of a printed error. The printed error is detected by the dictionary feature in response to printing operations. The electronic typewriter also automatically repositions a print hammer of a printing mechanism to the printed error position from a position beyond the printed error. This is accomplished by an operator actuating a key or a multiple key sequence for finding the printed error by the electronics searching for and finding the added code signal.

6 Claims, 4 Drawing Figures

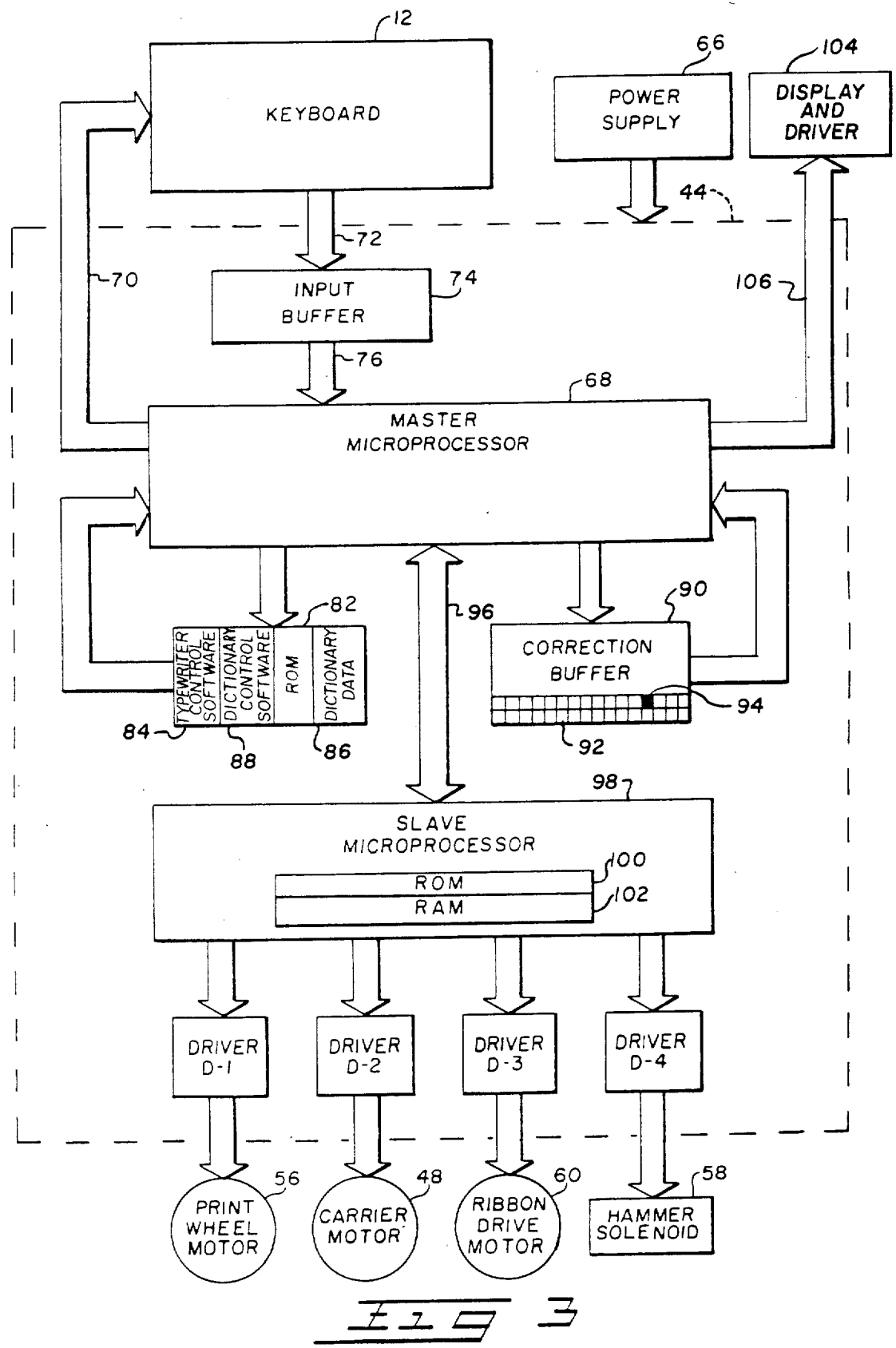

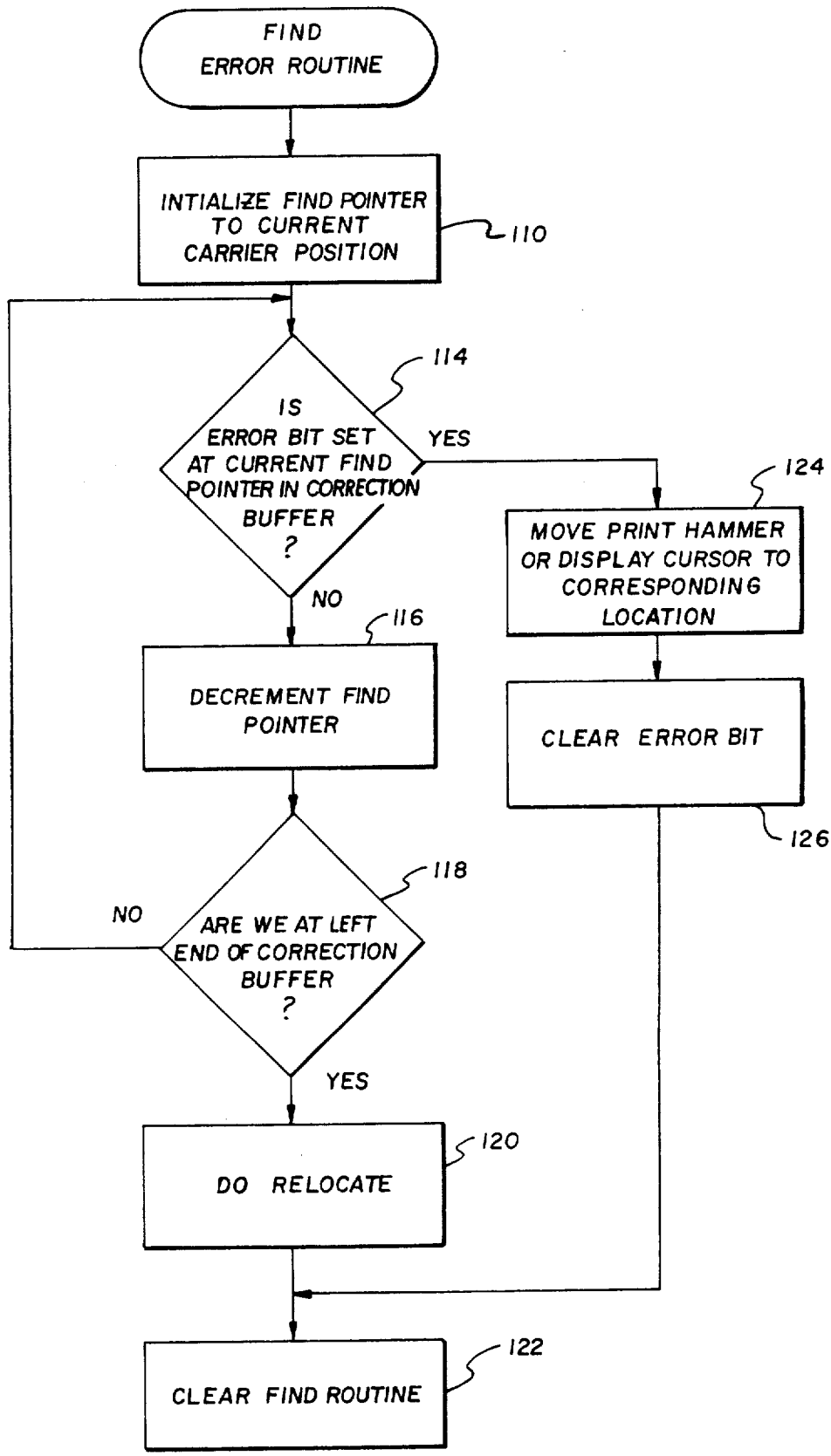

SPELLING ERROR FINDING FEATURE INCLUDING AN ELECTRONIC SPELLING DICTIONARY

BACKGROUND OF THE INVENTION

1. Field of the Invention

This invention relates to an error correction system for an electronic typewriter with an electronic spelling dictionary feature included therein. More particularly, this invention relates to a feature for electronically finding a position of a spelling error.

2. Prior Art

Typewriter manufacturers are continually developing error correction systems to facilitate the task of correcting errors. Electronics in typewriters have promoted error correction capabilities in that the typewriter is afforded the ability to "remember" the last plurality of printed characters which can be automatically recalled from memory for correction purposes. Such a self correcting system has made the task of erasing characters simpler by providing a correction key that eliminates the burden of actuating the character key of the unwanted character.

A system normally used to find a printed error when a print hammer of printing mechanism has moved along a print line beyond a printed error is having an operator visually locate the printed error and then actuate one or more functions such as a carrier return key, a tabulation key, a backspace key and a spacebar to precisely align the print hammer with the printed error. This system for finding a printed error places a burden on the operator due to being time consuming and to requiring a high degree of accuracy.

An example of this system is disclosed in U.S. Pat. No. 3,780,846 issued Dec. 25, 1973 and invented by Robert A. Kolpek. The operator visually locates a printed error and then actuates an erase key which backspaces a printing mechanism. The operator releases the erase key when the print hammer reaches the printed error. The burden on the operator is the need to visually locate the printed error and the need to know when to release the erase key.

SUMMARY OF THE INVENTION

An electronic typewriter with an electronic spelling dictionary feature included therein is operable to detect a printed error at the time the error is made in response to printing operations. When a printed error is detected, an error bit (code signal) is automatically added to a code memory register corresponding to the print position of the printed error. The code memory register is operable to store code information for each print position. Also, when the printed error is detected, the electronics produces an audible warble to inform an operator that a printed error has occurred.

The electronic typewriter is also operable to automatically reposition a print hammer of a printing mechanism to the printed error position from a position beyond the printed error by the electronics searching for and finding any error bits added to code memory registers. This is accomplished by the operator performing a keyboard actuation for finding the printed error. When the print hammer of the printing mechanism has been located at the position of the printed error, the operator has a choice of erasing or not erasing the error or the word containing the error. Instead of erasing an error, the operator may be able to add or delete a character at some location within the printed word to correct the spelling error.

The system for finding an error defined by the present invention is equally as useful when installed in an electronic typewriter having a combination of an electronic spelling dictionary feature and a character display unit. The character display unit can be either built into the typewriter, such as a conventional 16 character display unit, or a CRT unit of a word processing system. When operating the typewriter in a mode for entering characters in the character display unit instead of printing on a work sheet, an error bit (code signal) is automatically added to a code memory register when an error has been detected by the dictionary feature. The dictionary feature detects the error at the time the error is made in response to keyboard entries. A find pointer (e.g. display cursor) automatically moves to the position of the error from a position beyond the error by the electronics searching and finding the error bit added to the code memory register. This is accomplished by the operator actuating a key or a multiple key sequence for finding the error. When the find pointer finds the error, the operator has a choice of erasing or not erasing the error. Instead of erasing an error, the operator may be able to add or delete a character at some location within the displayed word to correct the spelling error.

Accordingly, an object of this invention is to provide an electronic typewriter with a feature for conveniently and efficiently finding one or more errors either printed or shown on a character display unit.

Other objects, features and advantages of the invention will become more apparent from the following description, including appended claims and accompanying drawing.

BRIEF DESCRIPTION OF THE DRAWING

FIG. 3 is a block diagram of the electronics for controlling functional operations of the typewriter including the error finding feature.

FIG. 4 is a flow chart of the error finding routine according to the present invention.

DETAILED DESCRIPTION OF THE INVENTION

Figure 1:
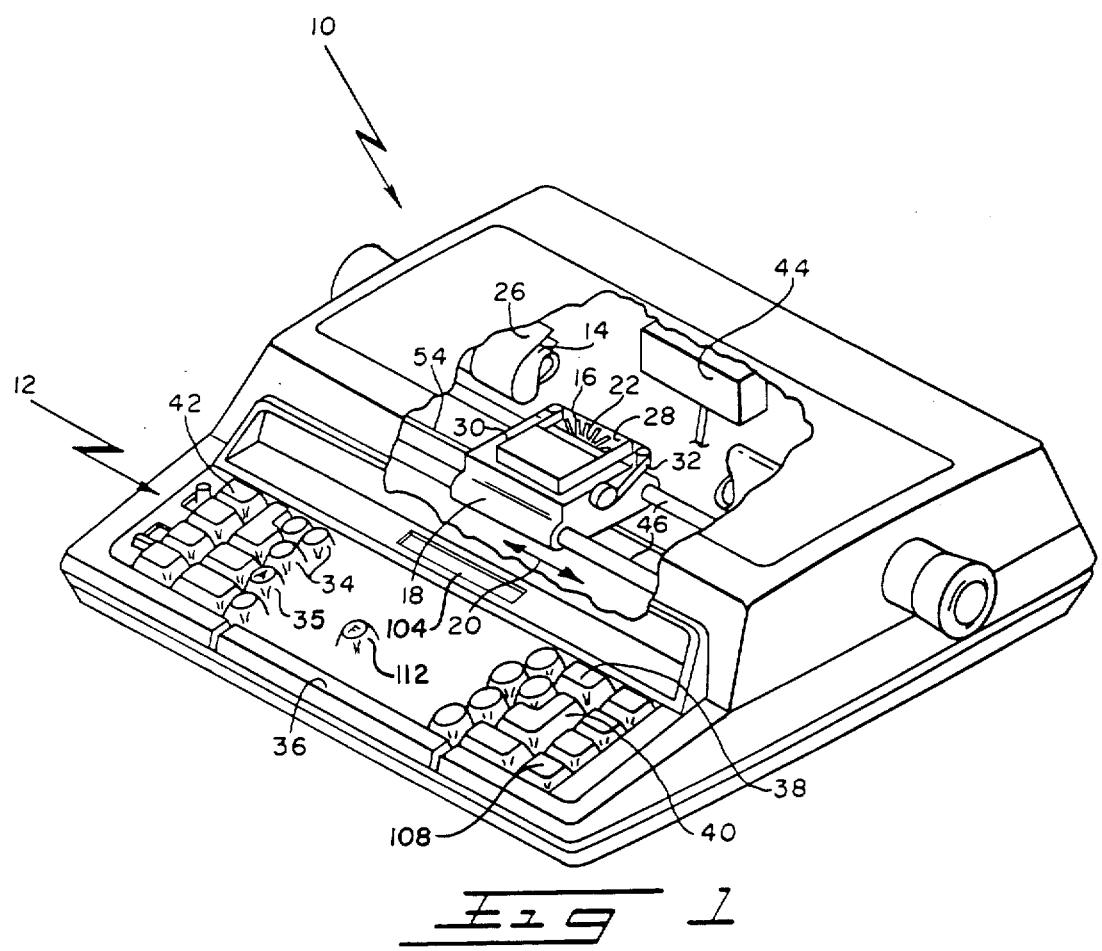
FIG. 1 is an isometric frontal view of an electronic typewriter sectioned to show components operated according to the teachings of the present invention.

An electronic correcting typewriter 10 according to the invention is shown in FIG. 1. Generally, an electronic typewriter 10 comprises a keyboard 12, a platen 14, a print wheel 16 and a carrier 18 which supports the print wheel 16. The carrier 18 is mounted in the typewriter 10 for left and right horizontal movement along platen 14 as is indicated by arrow 20.

Print wheel 16, also known as a "daisy" wheel, has a plurality of radial petals or spokes 22, each supporting a respective character of the keyboard 12. A print hammer 24 (FIG. 2) is positioned adjacent to print wheel 16 for striking an aligned petal 22 against a sheet of paper 26 or other recording medium supported on platen 14.

A print ribbon mechanism includes an exposed portion of inked ribbon 28 extending from a cartridge 30 which is mounted on the carrier 18. Carrier 18 also supports a correction mechanism including a correction ribbon 32. Inked ribbon 28 may be an inked fabric or carbon film type of ribbon and correction ribbon 32 may be of a type having a coating of adhesive or white overlay material for making lift-off or cover-up corrections.

Keyboard 12 contains the usual plurality of character keys 34 and carrier control function keys including a spacebar 36, a backspace key 38, a carrier return key 40 and a Code Key 42. Upon actuation of any key on keyboard 12, a respective keyboard output signal is communicated to an electronic control circuit 44 (FIG. 3) which has various outputs controlling functions and operations of typewriter 10, principally, operation of the print wheel 16 and other components assembled on carrier 18.

More specifically, when a character key 34 is depressed to print, e.g., key 35 representing the letter "a", a unique signal representative of that character is communicated to control circuit 44 which in turn generates appropriate commands for (1) rotating the print wheel 16 to bring the selected character petal 22 upright, (2) lifting the print ribbon 28 between the petal 22 and the sheet of paper 26, and (3) actuating the print hammer 24. The letter "a" will thus be imprinted over print ribbon 28 onto paper 26.

Further, when the spacebar 36 is depressed, a unique signal representing a forward "space" move to the right is communicated to control circuit 44 which in turn controls the carrier 18 to move forward one character position without printing. In a similar manner, carrier 18 is controlled to move backwards one character position in response to actuation of the backspace key 38. When the carrier return key 40 is actuated, the carrier 18 is caused to move leftwardly to the position of the left margin or stop setting and the paper 26 is indexed or fed upwardly for exposing a fresh print line.

Figure 2:
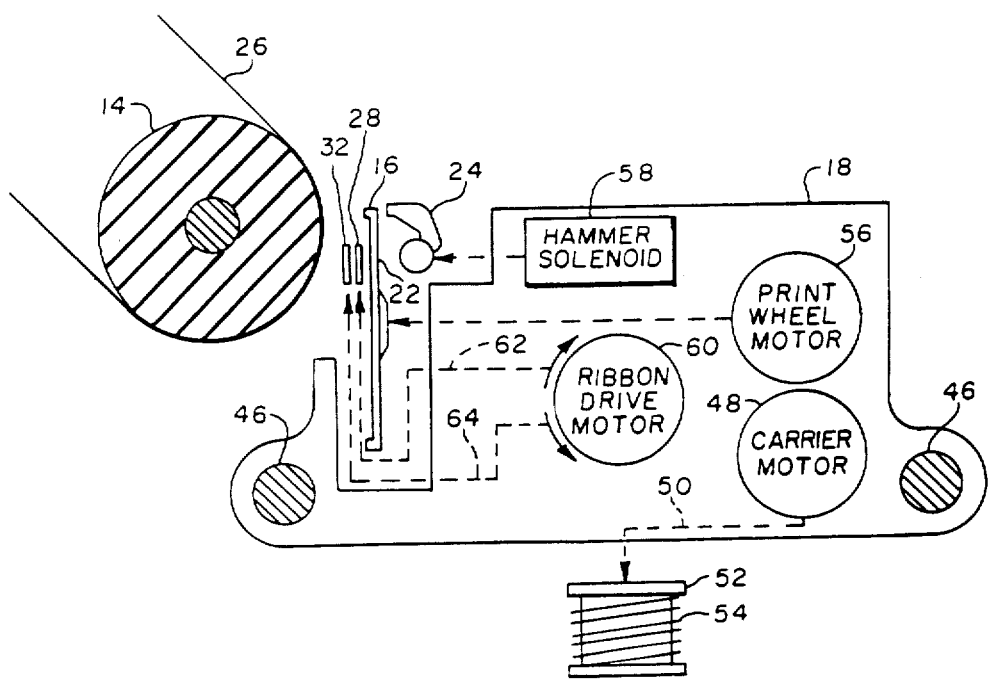
FIG. 2 is a schematic side view of a print carrier and a platen of the electronic typewriter of FIG. 1.

FIG. 2 shows a schematic diagram of the principal mechanisms assembled on carrier 18 and their relationship to platen 14. The showing of FIG. 2 is schematic only in order to facilitate an understanding.

As previously mentioned, carrier 18 is able to move horizontally to the left and right as indicated by arrow 20 of FIG. 1. Carrier 18 is supported to slide on guide rails 46 fixedly mounted to extend parallel to platen 14. A Carrier Motor 48 is coupled by a mechanical linkage, schematically represented by a broken line 50, to rotatively drive a cable pulley 52. A cable 54 is wound about pulley 52 in a manner permitting simultaneous winding and unwinding. The cable 54 is fixedly anchored to the typewriter 10 to prevent movement of the cable 54 in the direction of the carrier movement. Carrier Motor 48 is operated under control of control circuit 44 for causing carrier 18 to move to the left or to the right along the platen 14 by the pulley 52 winding and unwinding along the fixedly anchored cable 54.

Print wheel 16 is operated by a Print Wheel Motor 56 so that any radial petal 22 can be rotatively brought upright for printing. Print Wheel Motor 56 is also operated under control of control circuit 44. After the selected character petal 22 is located upright, hammer 24 is fired by a connected Hammer Solenoid 58 also under control of the control circuit 44. The upright petal 22 is deflected by the propelling hammer 24 to strike against the paper 26 on the platen 14 for either printing over print ribbon 28 or erasing over correction ribbon 32 when typewriter 10 is operated in correction mode.

The ribbons 28, 32 are operated by a Ribbon Drive Motor 60 under control of the control circuit 44. A mechanical linkage, schematically represented by broken line 62, couples the Ribbon Drive Motor 60 to operate print ribbon 28 and a mechanical linkage 64 is connected from the Ribbon Drive Motor 60 to enable operation of the correction ribbon 32. The Ribbon Drive Motor 60 operates one ribbon when driven in one direction and operates the other ribbon when driven in the other direction. For example, when the Ribbon Drive Motor 60 is powered clockwise, the print ribbon 28 is raised and, when the Ribbon Drive Motor 60 is operated in correction mode to rotate counterclockwise, the correction ribbon 32 is raised as is illustrated in FIG. 2.

The block diagram of FIG. 3 provides an overall view of the control circuitry 44 used for implementing the error finding feature of the present invention. A Power Supply 66 is connected to supply the electric power necessary to operate the various electronic components in control circuitry 44. As is shown in FIG. 3, keyboard 12 communicates with a known Master Microprocessor 68 as a result of an equally known interrupt technique issued periodically (e.g. every 7 milliseconds) on bus line 70. Master Microprocessor 68 is a known electronic component, such as, the 8031 made by Intel Corporation of Santa Clara, Calif. As a result of the interrupt, the keyboard 12, and more particularly, the matrix arrangement of keys is scanned to detect any key actuations. A logic code signal representative of a key actuation appear on bus line 72 extending to an Input Buffer 74. Keyboard signals are temporarily stored by the Input Buffer 74 in the order of keyboard input. Master Microprocessor 68 receives data from Input Buffer 74 via bus line 76. The input Buffer 74 is a Hex Non-Inverting buffer, such as a CD 4503 manufactured by National Semiconductor of Santa Clara, Calif.

Master Microprocessor 68 is associated with external electronics including a ROM unit 82 for controlling operation of Master Microprocessor 68. Included in ROM unit 82 is typewriter control software 84, dictionary data 86 comprising character codes forming a list of words and dictionary control software 88. A Correction Buffer 90 is operatively associated with Master Microprocessor 68 and includes a stack of memory cells or code memory registers 92 for storing code information of selected characters processed by Master Microprocessor 68. The Correction Buffer 90 is addressable by a display cursor or a find pointer 94 (shown solid), located at one register corresponding to the current location of carrier 18. In this regard the character of the current carrier 18 position can be recalled from Correction Buffer 90 for correction purposes. Find pointer 94 progressively moves through the stack of memory registers 92 in conjuunction with movement of carrier 18 so that one register has character information of a related one character position along platen 14. A 4096 bit (1024×4 bits) static RAM identified as 2114 preferably comprises Correction Buffer 90.

A character code signal ready for typewriter processing is sent along line 96 (output channels) from Master Microprocessor 68 to a further microprocesor 98 which is slaved with respect to microprocessor 68 as master. Slave Microprocessor 98 (e.g. the 8051 also made by Intel and identical to the 8031 except for program memory) has an internal program stored in a ROM (4K×8 Read Only Memory) 100 and the code data being stored in a RAM (128×8) 102. Code data is read from RAM 102 as necessary for the program in ROM 100 to develop, in known fashion, the control and drive signals for operational control of the various elements of carrier 18 namely, Printwheel Motor 56, Carrier Motor 48, Ribbon Drive Motor 60 and Hammer Solenoid 58.

The dictionary control software 88 compares character code signals for each character entered from the keyboard 12 with character code signals forming the list of words in the dictionary data 86 for detecting spelling errors. When a spelling error is detected, the control circuit 44 provides an audible warble (not shown) to inform the operator that an error has occurred. Also, when a spelling error is detected, an error bit (code signal) is added to the code memory register 92-in the Correction Buffer 90 corresponding to the print position of the spelling error. The purpose for adding an error bit at the print position will be explained below.

External Drivers D-1, D-2, D-3 and D-4 are connected to receive code data read from RAM 102 of Slave Microprocessor 98 for controlling operation of motors 56, 48, 60 and solenoid 58, respectively. Drivers D-1, D-2 and D-3 are conventional Quad Drivers (e.g. 2069) for decoding the data and for issuing appropriate control signals to connected motors 56, 48, and 60. The driver control signals regulate precise angular rotation and direction of motors 56, 48 and 60. Driver D-1 issues appropriate signals to Printwheel Motor 56 for rotatably positioning print wheel 16 according to the code generated by one of the character keys 34. Driver D-2 develops the signals necessary for stepping Carrier Motor 48 to incrementally move carrier 18 through character positions along platen 14. Driver D-3 controls the Ribbon Drive Motor 60, such that, print ribbon 28 is operated (via linkage 62) for printing when motor 60 is energized to rotate in one direction (clockwise in FIG. 2) and correction ribbon 32 is enabled (via linkage 64) for erasing when motor 60 is energized to rotate in the opposite (counterclockwise) direction. Typewriter 10 is operating in correction mode when Ribbon Drive Motor 60 is controlled to rotate in the counterclockwise direction enabling ribbon 32. Driver D-4 is in the form of a known kind of electronic latch for controlling operation of Hammer Solenoid 58 and is timed with respect to the other drivers D-1, D-2 and D-3 such that hammer 24 is actuated after printwheel character selection is made and one of the ribbons 28, 32 is elevated.

As previously stated, the system for finding an error defined by the present invention is equally as useful when installed in an electronic typewriter having a combination of an electronic spelling dictionary feature and a character display unit. A character display unit 104 (FIG. 1) is built into the typewriter 10. This display unit 104 has a commonly used maximum capacity display of sixteen characters. The display unit 104 (FIG. 3) is connected to receive code data from the Master Microprocessor 68 via bus line 106 for entering characters on the display unit 104.

One method of initializing the operation of the error find feature is to depress a function key 108 on the keyboard 12. The function key 108 is dedicated as a single key operation for the present invention. Another method of initializing the operation is to depress a multiple key sequence. The sequence is first depressing the Code Key 42 and then depressing a Find Key 112. The Find Key 112 is a character key 34 representing the letter "F". It is common practice to use a character or number key 34 on the keyboard 12 in combination with a code key 42 to operate a typewriter function other than the specific character or number.

In the flow chart of FIG. 4, the following conventional box shapes are used: boxes with semi-circular ends represent the start of a subroutine, a rectangle box represents a processing function or an operation, and a diamond box represents a decision for selecting one of two alternative outputs. As with most microprocessors, the control circuit 44 of FIGS. 1 and 3 has a regular program idling loop in which it makes rounds or sequential interrogations of the various registers and initiates certain routines or operations according to the status of these registers or flags. For clarity and ease of description, only the portions of routines relevant to the present error finding feature are depicted in the flow chart.

In accordance with the present invention, in the flow chart of FIG. 4 there is a subroutine entitled "Find Error Routine". The first box 110 in this routine relates to the first operation in response to actuation of the dedicated function key 108 or the multiple key sequence of the Code Key 42 and the Find Key 112. The first operation is to initialize the find pointer 94 at the current print position of the printing mechanism. The next Box 114 is a decision to determine if an error bit has been added or set at the current print position of the find pointer 94. If the determination is NO, then the operational Box 116 is activated. The operation of the Box 116 is to decrement the find pointer 94 to the next lower order which is equivalent to one print position in the backspace direction.

A decision is then made by box 118 to determine if the find pointer 94 is at a left end of the correction buffer 90. If the determination is NO, then the path from the Box 118 is taken to the decision Box 114 to determine if an error bit has been added at the next lower order code memory register 92 which corresponds to the next lower order print position. This cyclic operation through Boxes 114, 116 and 118 will automatically continue until the left end of the correction buffer 90 is reached or until the find pointer 94 finds an error bit set in a code memory register 92 at a print position. If a determination is YES at Box 118, then the flow goes to an operational Box 120. In Box 120, the print hammer 24 is relocated to the original print position and the find pointer 94 is relocated to the original code memory register 92 when the Code Key 42 and the Find Key 112 have been actuated. Upon completion of the relocation operation of the Box 120, the flow goes to an operational Box 122 to clear the find routine.

If a determination is YES at Box 114, then the flow goes to an operational Box 124. In Box 124, the print hammer 24 of the printing mechanism is moved to the print position corresponding to the code memory register 92 with the added error bit. The purpose and advantage of the present invention is to automatically move the print hammer 24 to the printed error position from a position along a print line beyond the printed error position. The print hammer 24 being supported on the carrier 18 is moved to the printed error position by the Driver D-2 energizing the carrier motor 48. The carrier motor 48 rotates the pulley 52 which winds and unwinds the cable 54 for moving the carrier 18. The flow then goes to an operational Box 126 which clears the error bit in response to the print hammer 24 reaching the position of the printed error. Upon completion of the clear error bit operation of the Box 126, the flow goes to an operational Box 122 to clear the find routine.

When a spelling error is located in the code memory register 92 but is not located in the display unit 104, then the Box 124 is operable to place a portion of the character codes containing the spelling error in the display unit 104. The Box 124 is also operable to move the Cursor 94 to the display position of the spelling error.

When two or more spelling errors have been detected by the spelling dictionary feature and an error bit has been added to each code storing register 92, the actuation of the function key 108 or the sequence of the Code Key 42 and the Find Key 112 needs to be repeated to find each error.

In summary, it can now be understood that the present invention provides an electronic typewriter 10 with a feature for conveniently and efficiently finding an error. The automatic setting or adding an error bit in a code memory register 92 corresponding to a print position of a spelling error detected by the spelling dictionary feature, the searching for and finding the print position of the spelling error by the find pointer 94 and the automatic relocating of the print hammer 24 of the printing mechanism to the print position of the spelling error eliminates the burden of the operator to visually locate the printed error and to accurately relocate the printing mechanism to the error.

What is claimed is:

1. An error finding system for use in an electronic typewriter having a keyboard including a plurality of character and function keys selectable for issuing unique signals, a platen, a carrier, a printing mechanism including a print hammer supported on the carrier for printing characters at selected print positions on a recording medium supported on the platen, a correction mechanism for erasing previously printed characters from the recording medium, bi-directional feeding means for horizontally moving the carrier relative to the platen, electronic processor means for receiving the unique signals from selected keyboard keys and for controlling functional operation of typewriter mechanisms in accordance to the signals received, an electronic spelling dictionary connected to the processor means, the dictionary being operable to detect spelling errors at print positions in response to printing operations, a correction buffer connected to the processor means, the correction buffer including a plurality of memory registers capable of storing therein character codes representative of the last plurality of printed characters and find pointer means operative in the correction buffer for pointing to a selected one of the plurality of memory registers and the memory register pointed to by the find point means relating to the current print position of the carrier, the error finding system comprising:
   means for adding a code signal at a position of a spelling error detected by the dictionary in response to printing operations;
   electronic means for finding said code signal added to the position of the spelling error in response to keyboard actuation; and
   means for repositioning the print mechanism to align the print hammer with a print position having said code signal from a position beyond the print position of the spelling error in response to said keyboard actuation.

2. The error finding system of claim 1 wherein said code signal is an error bit added to the position of a spelling error.

3. The error finding system of claim 2 wherein said error bit is added to a memory register corresponding to the print position of the spelling error.

4. The error finding system of claim 1 wherein said electronic means includes the find pointer means operable to move from one memory register to another memory register and operable to stop at a memory register having said code signal.

5. An error finding system for use in an electronic typewriter having a keyboard including a plurality of character and function keys selectable for issuing unique signals, a character display unit, electronic processor means for receiving the unique signals from actuated keyboard character keys and for transmitting the unique signals to the character display unit for displaying characters corresponding to the actuated keyboard character keys, an electronic spelling dictionary connected to the electronic processor means, the dictionary being operable to detect spelling errors at character display positions in response to keyboard entries, a correction buffer connected to the processor means, the correction buffer including a plurality of memory registers capable of storing therein character codes representative of the last plurality of actuated keyboard character keys, a display cursor operative in the correction buffer for pointing to a selected one of the plurality of memory registers, the memory register pointed to by the display cursor relating to a current character display position, error correction means for changing characters displayed by the character display unit, the error finding system comprising:
   means for adding a code signal to a memory register corresponding to a character position of a spelling error detected by the dictionary in response to keyboard entries;
   electronic means including the find pointer means for finding said code signal added to the memory register in response to keyboard actuation; and
   electronic means for placing the spelling error in the display unit from a memory register and for positioning the display cursor at the display position of the spelling error.

6. A method for finding a printed error in an electronic typewriter having a keyboard including a plurality of character and function keys selectable for issuing unique signals, a platen, a carrier, a printing mechanism including a print hammer supported on the carrier for printing characters at selected print positions on a recording medium supported on the platen, a correction mechanism for erasing previously printed characters from the recording medium, bi-directional feeding means for horizontally moving the carrier relative to the platen, electronic processor means for receiving the unique signals from selected keyboard keys and for controlling functional operation of typewriter mechanisms in accordance to the signals received, an electronic spelling dictionary connected to the processor means, the dictionary being operable to detect a spelling error at print positions in response to printing operations, a correction buffer connected to the processor means, the correction buffer including a plurality of memory registers capable of storing therein character codes representative of the last plurality of printed characters and find pointer means operative in the correction buffer for pointing to a selected one of the plurality of memory registers and the memory register pointed to by the find pointer means relating to the current print position of the carrier, the method for finding a printed error comprising the steps of:
   adding an error bit to a memory register corresponding to a print position of a spelling error detected by the dictionary in response to printing operations;

moving the find pointer means to sequentially point at each memory register in response to keyboard actuation;
stopping the find pointer means at the memory register containing said error bit; and
repositioning the print hammer to align with a print position corresponding to the memory register containing said error bit from a position beyond the print position of the spelling error in response to said keyboard actuation.

* * * * *